United States Patent [19]

Lara

[11] Patent Number: 4,747,317
[45] Date of Patent: May 31, 1988

[54] SYSTEM FOR SURVEYING FLUID TRANSMISSION PIPELINES AND THE LIKE

[75] Inventor: Pedro F. Lara, Dallas, Tex.

[73] Assignee: Atlantic Richfield Company, Los Angeles, Calif.

[21] Appl. No.: 944,308

[22] Filed: Dec. 18, 1986

[51] Int. Cl.$^4$ ............................................. G01C 9/06
[52] U.S. Cl. ................................. 73/865.8; 73/866.5; 324/220; 33/544; 33/304; 33/310; 33/313
[58] Field of Search ................... 73/865.8, 866.5, 151; 324/220, 221; 33/544, 542, 302, 310, 313, 304, 533, 1 H, 178 F

[56] References Cited

U.S. PATENT DOCUMENTS

| | | |
|---|---|---|
| 2,834,113 | 5/1958 | Dean et al. |
| 2,940,178 | 6/1960 | Krueger |
| 3,163,487 | 12/1964 | Buck .............................. 324/221 X |
| 3,460,028 | 8/1969 | Beaver et al. |
| 3,789,511 | 2/1974 | Groom et al. ...................... 33/312 |
| 3,882,606 | 5/1975 | Kaenel et al. ....................... 33/544 |
| 3,896,412 | 7/1975 | Rohr ................................ 33/313 X |
| 4,071,959 | 2/1978 | Russell et al. ..................... 33/313 X |
| 4,163,324 | 8/1979 | Russell et al. ....................... 33/313 |
| 4,231,252 | 11/1980 | Cherkson ............................. 73/151 |
| 4,265,028 | 5/1981 | Van Steenwyk ................. 33/312 X |
| 4,361,192 | 11/1982 | Trowsdale ....................... 33/312 X |
| 4,399,692 | 8/1983 | Hulsing, II et al. ................. 73/151 |
| 4,468,863 | 9/1984 | Van Steenwyk ..................... 33/304 |
| 4,524,526 | 6/1985 | Levine ................................ 33/312 |
| 4,559,713 | 12/1985 | Ott et al. ............................. 33/302 |

FOREIGN PATENT DOCUMENTS

2088554A 6/1982 United Kingdom.

*Primary Examiner*—Tom Noland
*Attorney, Agent, or Firm*—Michael E. Martin

[57] ABSTRACT

A pipeline survey pig including an onboard inertial reference unit and signal processing units for receiving acceleration and angular velocity signals generated by the inertial reference unit, calculating resultant values of angular velocity and accelerations and averaging the calculated values to provide recordable signals related to the position of the pig and changes in curvature of the pipe. The pig is supported by a plurality of resilient cup shaped support members which have a stiffness characteristic whereby the natural frequency of vibration which may cause lateral excursions of the pig is less than the signal generating rate yet greater than the frequency of the signal to be measured. The center of stiffness and the center of gravity of the pig are disposed along the central axis of the pig and the pipeline section being measured and are preferably coincident with each other. The inertial reference unit includes three accelerometers and three gyroscopes oriented orthogonally and may have their axes oriented to intersect at the center of gravity and center of stiffness.

22 Claims, 3 Drawing Sheets

SYSTEM FOR SURVEYING FLUID TRANSMISSION PIPELINES AND THE LIKE

BACKGROUND OF THE INVENTION

1. Field of the Invention

The present invention pertains to a system for surveying fluid transmission pipelines which includes a pipeline pig with an onboard inertial reference unit for determining the curvature and the course of the pipeline in space.

2. Background

An important environmental and economic consideration with respect to fluid transmission pipeline operation and maintenance pertains to the monitoring of the pipeline from time to time to determine any changes in curvature which might result from earth heaving or subsidence. Changes in pipe curvature from a predetermined course may indicate impending failure which could be economically and environmentally catastrophic. Moreover, many fluid transmission pipelines have been laid with inaccurate or only generalized surveys of their location or course and it is important to determine with some accuracy the location of a pipeline at a given time for various reasons, including subsequent monitoring of the pipeline to determine if any changes in location or curvature have occurred which require attention or remedy.

The development of so called inertial navigation systems for aircraft and other vehicles has provided some background for utilizing the capability of this kind of equipment in pipeline monitoring and other survey processes. For example, U.S. Pat. No. 4,524,526 to S. Levine describes an apparatus for detecting deflections along the length of a pipeline wherein an inertial reference system is placed onboard a body which may be launched into and traversed through a pipeline, said body being commonly known in the pipeline art as a pig. The inertial reference system of the Levine patent generates signals indicative of its position in space which must be corrected by measuring any changes in the position of the pipeline pig with respect to the pipeline in order to arrive at the actual position or change in curvature of the pipeline itself. The device of the Levine patent requires a specially constructed pipeline pig having support arms which include sensing devices for measuring the change in attitude of the pipeline pig with respect to the pipeline so that any errors measured by the inertial reference system can be corrected to determine the actual location or changes in curvature of the pipeline.

Another approach to providing an improved pipeline survey or curvature measurement system is described in U.S. patent application Ser. No. 831,228 filed Feb. 19, 1986, in the name of Pedro F. Lara and assigned to the assignee of the present invention. The system described in the abovementioned patent application utilizes an inertial measurement unit comprising three orthogonally mounted accelerometers which are mounted within a pipeline pig and arranged along the central axis of the pig for taking measurements of changes in pipeline curvature and longitudinal position of the pig in the section of pipeline being measured. Changes of position such as roll and pitch attitude of the pig within the pipeline are minimized by providing for the center of gravity of the pig to be placed laterally spaced from the longitudinal pig axis, which axis is designed to be coincident with the pipeline axis by virtue of the construction of the pig support structure. Alternatively, the measurement system described in the subject patent application utilizes a clinometer to correct for accelerometer signals resulting from any rolling of the measurement unit about its axis within the pipeline during traversal thereof.

In the further development of pipeline survey and curvature measurement systems, it has been determined that it is particularly desirable to provide a structure for supporting and carrying an inertial measurement unit which undergoes minimal excursion relative to the pipe axis and to provide an inertial measurement unit and associated signal computing and recording apparatus which does not require compensation for movement of the support structure relative to the pipeline itself. This elimination of a potential source of error in making pipeline curvature and survey measurements is particularly important taking into consideration numerous factors. One important factor in making pipeline curvature and survey measurements pertains to the need to utilize an instrument support body, such as a pipeline pig, which is somewhat conventional in construction in the sense that the pig may be accommodated by a pipeline including its launching and receiving fittings, valves and other devices normally found within the pipeline with minimal likelihood that the pig will become stuck in the line during traversal thereof. For apparent reasons, it is important that the reliability factor be very high with regard to being able to traverse a survey device through an existing pipeline with minimal chance of damage to the pipeline or stalling of the device within the line. Moreover, the accuracy of the measurements taken by certain types of inertial measurement units onboard a pipeline pig also requires special considerations in constructing the pig which have actually resulted in a new and inventive concept and approach to providing a pipeline curvature measurement and survey system.

SUMMARY OF THE INVENTION

The present invention provides an improved system for determining curvature or the course of a fluid transmission pipeline which includes a support body such as a pipeline pig having an inertial reference or measurement unit disposed on board and arranged in such a way that the curvature or course of the pipeline can be measured by determining accelerations and angular velocities normal to the pig trajectory and the longitudinal velocity of the pig.

In accordance with one aspect of the present invention a pipeline survey system, including a pipeline pig having an inertial reference unit onboard, is provided wherein the inertial reference unit includes an arrangement of accelerometers and gyroscopes and may be mounted at or near the center of gravity of the pig. In accordance with another aspect of the invention the center of gravity of the pig preferably coincides with the so called center of stiffness of the pig. Still further, the center of gravity and center of stiffness preferably lie along the longitudinal central axis of the pig.

Yet a further consideration of the invention resides in providing a pig having a support structure characterized in such a way that the fundamental natural frequency of lateral vibration of the pig is substantially less than the frequency of signals generated by the inertial reference unit but greater than the pipe change in curvature. The features mentioned above taken separately and, particularly, taken together provide for a pipeline survey system that does not require means for measuring the position of the pig relative to the pipe, thus eliminating complicated support structure and a source of error for pipeline survey or curvature measurements.

In accordance with another important aspect of the present invention, there is provided a pipeline survey system including a pipeline pig adapted to traverse the line with minimum or negligible excursion of the pig in the pitch or yaw mode relative to the pipeline itself and having thereon an inertial reference unit characterized by three gyroscopes and three accelerometers mounted orthogonally, an onboard computer, longitudinal position and/or velocity sensing means such as a magnetic weld sensor and an accurate clock whereby curvatures along a buried or exposed section of pipeline may be measured accurately. Curvature is preferably detected by measuring angular velocity of two gyroscopes each located normal to each other and to the pig trajectory and the pig's longitudinal velocity using at least one of the accelerometers or a girth weld sensor system. A second technique for measuring curvature can be carried out by measuring the accelerations normal to the pig trajectory and the longitudinal velocity. Accelerations and longitudinal velocity are measured with at least two accelerometers and a magnetic anomaly sensor, respectively, while gyroscopes associated with the inertial reference unit evaluate the spacial orientation of the pig and provide for the subtraction of gravity effects from the total acceleration signals measured by the accelerometers. In an alternate embodiment of the magnetic anomaly sensor, the time lapse between separate measurements of passing a particular girth weld may also be used to determine pig longitudinal velocity and thus position in a particular pipe being surveyed.

In accordance with still further aspects of the present invention, there is provided a pipeline survey system including a pig having generally conventional geometry to minimize the risk of the pig becoming stuck in a pipeline and wherein the pig support structure is made in such a way that a structural stiffness is sufficient that the natural frequencies of vibration, including rigid body vibrations, are substantially higher than the frequencies of interest to be measured. The pig support structure is of an overdamped design. Still further, the distribution of the components mounted on board the pig will be such that the pig's center of mass preferably lies on its longitudinal central axis and at the so-called center of stiffness wherein any tendency for the pig to undergo lateral deflection in the pipe will be equal in any direction with respect to said center of stiffness.

Yet another superior aspect of the invention pertains to a system wherein measured values of angular velocity, acceleration and angle of rotation of the pipeline pig about the pipeline longitudinal axis are input to an onboard computer which calculates values of angular velocity and acceleration in a tangential direction with respect to the pipe axis and in a vertical plane normal to the plane of the tangential direction and which passes through the pipe axis. These values of computed angular velocity and acceleration are averaged to filter out error signals due to excursions of the pig relative to the pipe and then stored in an onboard memory unit for later calculation of curvature in the so called tangential and vertical planes. In this way, greater accuracy of the resultant signals is obtained, substantially reduced onboard computer storage capacity is required and computation of actual curvatures of the pipeline may be determined more rapidly once the survey run of the pig has been completed.

The abovementioned features and advantages of the present invention, together with other superior aspects thereof, will be further appreciated by those skilled in the art upon reading the detailed description which follows in conjunction with the drawing.

DESCRIPTION OF PREFERRED EMBODIMENTS

In the description which follows, generally known and conventional components are described in general terms only. Certain features are illustrated in the drawing figures in schematic form in the interest of clarity and conciseness.

The present invention is particularly adapted as a pipeline curvature measurement and survey system for use in a fluid transmission pipeline, such as a crude oil pipeline. An extensive network of crude and refined petroleum as well as gas pipelines exist throughout the world. One of the more critical pipeline systems in terms of economic and environmental considerations is the Trans-Alaska Pipeline System which transports crude oil and natural gas liquids from the Alaskan North Slope to the ice free port of Valdez, Ak. The Trans-Alaska Pipeline System includes numerous portions of the overall pipeline course which are buried beneath the earth's surface. The soil stability conditions in certain regions of Alaska and the effects of freezing and thawing on the earth strata impose strains on the buried sections of pipe and it is desirable to monitor the pipe to minimize the likelihood of incurring severe curvatures which could result in pipe rupture. In accordance with the present invention, a system has been developed which includes a transport body which may be propelled through the pipe by the fluid within the pipe itself, a device similar to what is commonly known as a pipeline pig.

Figure 1:
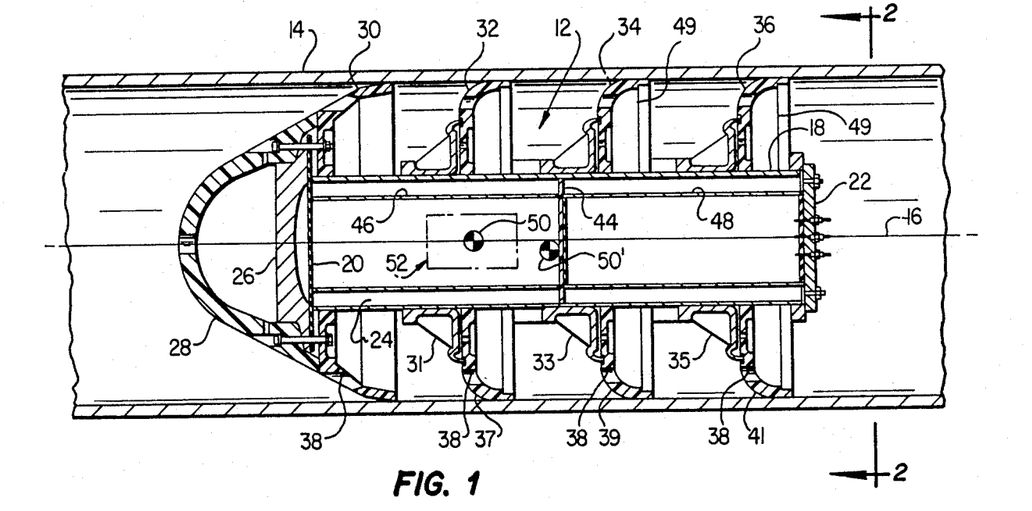
FIG. 1 is a longitudinal central section view of an improved apparatus for surveying fluid transmission pipelines in accordance with the present invention.

Referring to FIG. 1, there is illustrated a pipeline pig 12 having generally outwardly appearing conventional construction but which has been specially modified in a novel way to provide a system according to the present invention. The pig 12 is shown disposed in a section of generally cylindrical fluid transmission pipe 14 having a longitudinal central axis 16. The pig 12 includes a generally cylindrical body 18 which is supported within the pipe 14 so that its longitudinal central axis is coincident with the axis 16. The body 18 includes fore and aft transverse bulkheads 20 and 22 forming closures for an interior space 24. A support ring 26 is secured to the bulkhead 20 and forms a support for a resilient impact nose or bumper 28 having a somewhat streamlined or curved leading edge.

In a preferred form, the body 18 is supported by a plurality of spaced apart somewhat cylindrical cup shaped members 30, 32, 34, and 36. The cup shaped members 30, 32, 34, and 36 each have one or more pressure relief ports 38 formed therein to permit a certain flow of fluid to bypass the pig 12 even when it is disposed in the interior of the pipeline. However, the volume of fluid normally being pumped through a pipeline is sufficient to forcibly propel the pig 12 through the pipe 14 at a relatively constant velocity.

Figure 2:
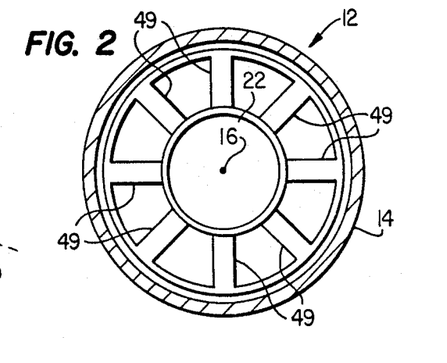
FIG. 2 is a transverse end view showing the stiffening rib configuration of one of the cup shaped support members.

Viscous liquids such as crude oil and refined hydrocarbon products are particularly suitable for pumping the pig 12 through a pipeline in a relatively damped mode. It is, in fact, desirabe to provide the configuration of the pig 12 so that it has neutral buoyancy in the fluid in which it is disposed in the pipeline 14. This buoyancy can, of course, be adjustment by adding or subtracting ballast from the space 24 within the body 18. Each of the support members 30, 32, 34, and 36 is provided with a suitable support structure for connecting the support members to the body 18. In a preferred embodiment the support member 30 is formed integral with the impact nose 28 as a resilient molded member. At least the support members 32, 34 and 36 are each preferably formed of a resilient material such as molded polyurethane and are suitably secured to substantially rigid support members and spacers 31, 33 and 35, respectively. The support members 32, 34 and 36 are also provided with generally curved circumferential outer peripheral portions 37, 39 and 41 which engage the inner wall surface of the pipe 14 to support the pig so that its longitudinal axis is coincident with the axis 16. The stiffness of the support members 32, 34 and 36 may be modified by the provision of a plurality of radially ending circumferentially spaced ribs 49, see FIG. 2, molded integral with the support members.

The interior space 24 of the body 18 is provided with suitable means including a bulkhead 44 for supporting instrument enclosures 46 and 48 which may be removed from the end of the body closed by the aft bulkhead 22 for servicing or replacement of the components housed within the enclosures and which will be described in further detail herein.

One important aspect of the present invention pertains to the configuration of the pig 12 wherein the center of gravity 50, FIG. 1, of the pig 12 is preferably disposed on or only slightly displaced from its central longitudinal axis, which axis is coincident with the axis 16 of the pipeline 14. By placing the center of gravity 50 on the axis 16 the pig 12 does not have a tendency to roll about the axis 16 in any particular direction. Alternatively, by placing the center of gravity spaced from the axis 16 a distance of less than about 5% of the diameter of the pipe 14 and preferably within a range of about 1% to 2% of the diameter of the pipe 14 from and below the central axis 16, the pig 12 will be stabilized to minimize any tendency to roll. However, slight displacement of the center of gravity from the central axis such as at 50', FIG. 1, will not affect the stability of the pig about its pitch or yaw axes during traversal over nonhorizontal segments of pipe. The center of gravity 50' is also shown closer to the geometric center of the pig 12 and the stiffness of th support members 30, 32, 34 and 36 can also be modified to place the center of stiffness at the center 50'.

Of further importance is the fact that the center of stiffness of the pig 12 with respect to the support members 30, 32, 34 and 36, is preferably coincident with the centers of gravity 50 or 50'. The center of stiffness is defined as the point about which the tendency for the pig 12 to deflect in a direction away from the axis 16 is substantially equal in a longitudinal or fore and aft direction. In other words, the resilience of the support members 30, 32, 34, and 36 is such that any tendency of the pig to oscillate about its pitch and yaw axes is equal with respect to the center 50 or 50'.

Figure 3:
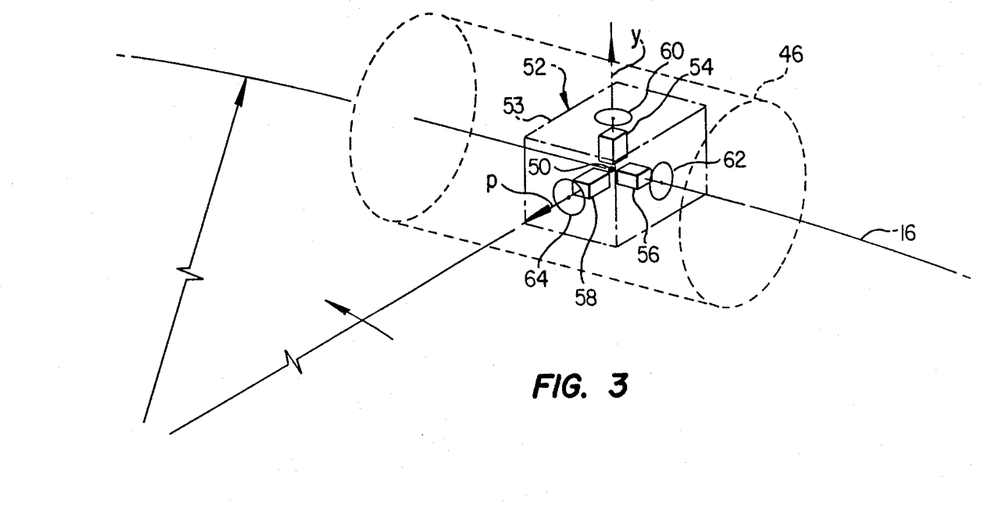
FIG. 3 is a schematic diagram illustrating one preferred arrangement of an inertial reference unit mounted in the apparatus illustrated in FIGS. 1 and 2.

The improved survey apparatus which includes the pig 12 is further characterized by the provision of an inertial reference unit comprising a series of instruments or sensors including three gyroscopes and three inertial grade accelerometers which are capable of generating signals which may be adapted to provide the position of the pig 12 in space at any particular point in the pipeline 14 and thus the position of the pipeline itself. The pitch, roll and heading attitude of the pig 12, and the velocity of the pig through the pipeline 14 may also be determined. One form of inertial reference unit which is well adapted for the pig 12 is illustrated schematically in FIG. 3. FIG. 3 is a schematic diagram of the pig 12 showing only the enclosure 46 disposed on the longitudinal axis 16. The remainder of the pig structure for the pig 12 has been omitted from the drawing figure in the interest of clarity.

In FIG. 3, the enclosure 46 is shown supporting an inertial reference unit, generally designated by the numeral 52. The inertial reference unit 52 includes three orthogonally arranged accelerometers, 54, 56 and 58. The accelerometer 56 is mounted to sense changes in velocity along the pipe longitudinal axis 16 and the accelerometers 54 and 58 are mounted to sense accelerations along axes y and p which are normal to each other and to the axis 16. The point of intersection of the axes 16, y and p is preferably coincident with the center of gravity and center of stiffness 50. The inertial reference unit 52 also includes three stabilizing instruments or gyroscopes 60, 62 and 64 which are illustrated as being mounted to have their axes of rotation coincident with the axes y, 16 and p, respectively. Although the gyroscopes 60, 62 and 64 are not required to have their axes coincident with the sensing axes of the respective accelerometers 54, 56 and 58, they have been illustrated as such for convenience. In any case, three orthogonally mounted gyroscopes are desirably provided to sense the position of or stabilize the "platform" 53 of the inertial reference unit 52 so that the directions of acceleration sensed by the accelerometers 54, 56, and 58 can be properly referenced and angular velocities of the pig about the pitch axis (p) and the yaw axis (y) can also be determined.

The schematic illustration of the accelerometers 54, 56 and 58, and gyroscopes 60, 62 and 64, is for reference only as regards the principal features of the present invention. One commercially available type of inertial reference unit which is preferable for use in the improved survey apparatus of the present invention is a type based on the use of so-called ring laser gyroscopes mounted in a strap-down configuration to a rigid support element such as the platform 53 for sensing the position of the acceleration axes 16, y and p so that the actual attitude of the accelerometers can be compensated for when determining the position of the inertial reference unit in space. Moreover, the provision of the gyroscopes 60, 62 and 64 also allows for compensation in the accelerometer readings of the effects of gravitational forces on the inertial reference unit. A suitable inertial reference unit of the general type described in conjunction with FIG. 3 is a type IRS Inertial Reference Unit manufactured by Sunstrand Data Control, Inc., Redmond, Wash. The abovementioned commercially available inertial reference unit contains inertial sensing elements comprised of three ring laser gyroscopes, three inertial grade accelerometers, an electrical power supply for the gyroscopes and associated electronic control elements. The inertial reference unit also includes the requisite electronic components to perform the actual inertial alignment and navigation computations and provides output signals which may be recorded or transmitted to a suitable display unit.

Changes in direction of the pipeline through which the pig 12 is being traversed can be detected in two ways. One way is by measuring normal accelerations to the pig trajectory using signals generated by the accelerometers 54 and 58, corrected for gravitational effects, wherein the curvature, or the inverse of the radius of the pipe central axis 16, is determined from the equation:

$$k = a_n / V^2 \quad (a)$$

where k=curvature, $a_n$=normal acceleration and V=longitudinal velocity.

A corroborating curvature measurement may be made by measuring the angular velocity of the gyroscopes disposed normal to the pig trajectory and by measuring the pig longitudinal velocity. The pipe curvature can then be obtained by the equation:

$$k = w_n / V \quad (b)$$

where $w_n$=angular velocity of or induced by a gyroscope disposed normal to the pig trajectory.

The longitudinal velocity of the pig 12 along the axis 16 can be measured by integrating in time the signal generated by the accelerometer 56, by sensing markers along the pipe 14 or by suitable odometer means. One convenient way of measuring the velocity of the pig in a pipe having known spaced apart markers such as girth welds between pipe sections can be carried out using a sensor which detects the magnetic anomaly caused by the presence of the weld formed at the joint between pipe sections. In pipelines where the spacing of the girth welds between pipe sections is known, the actual velocity of the pig through such a pipeline may be easily determined by measuring the rate at which the pig passes such welds. Other forms of markers such as the spacing between valves in the pipeline and other devices purposely used for providing velocity measurements may also be provided. For pipelines wherein the spacing between girth welds or other known indicators are not provided, an arrangement is provided for taking sequential measurements of a particular magnetic anomalies to determine pig longitudinal velocity.

The abovedescribed type of pipeline pig incorporating an inertial reference unit of the type identified herein has particular advantages in surveying and measuring curvature of fluid transmission pipelines when the features provided according to the present invention are present. Although the resilient cup shaped support members described in conjunction with the pig 12 are a preferred design, the support members might comprise a plurality of circumferentially spaced hinged support arms which are spring biased to engage the inner wall surface of the pipe. The body 18 is preferably made of a relatively light composite material to minimize the pig mass.

In addition to providing a structure which is unlikely to undergo pitch, roll and yaw excursions within the pipeline, signals for determining accelerations, angular velocities and longitudinal velocity along the axis 16 are desirably generated at a rate of about 50 Hertz (Hz) or greater. Every 10 or more signals sampled may be averaged to provide recorded signals of acceleration and angular velocity and longitudinal velocity or position of the pig within a section of pipe. Depending on the flow velocity of the fluid propelling the pig 12, the signal sampling rate may be relatively high per foot of pipeline length. For example, at a velocity through a pipe of ten feet per second and a sampling rate of 50 Hz, five signals per foot of pipeline length indicating acceleration, velocity and position may be obtained. If only one average signal of every 10 signals is retained, a curvature value for every two feet of pipeline length may be provided. If the pig 12 is designed to have a natural frequency of oscillation or lateral excursion within the pipe on the order of about 20 Hertz and the sampling frequency of the inertial reference unit 52 is 50 Hertz, for example, events induced by wall irregularities in the pipe will have minimal effect on the signals recorded which indicate the change in curvature or location of the pipe in space. By averaging a selected number of measured or resultant calculated signals, error signals due to excursions of the pig relative to the pipe can be suitably filtered out of the curvature data.

Centrifugal forces acting on the pig 12 as it traverses a curved portion of pipe tend to induce rocking of the pig and to induce rotation of the pig about its longitudinal axis. By locating the center of stiffness at the center of mass 50 the pig 12 will be "balanced" to minimize rotation and to also minimize any rocking motion. However, rotation of the pig about its longitudinal axis can be accomodated by the inertial reference unit 52 and the signals generated by the unit 52 can be corrected for such rotation.

Figure 4:
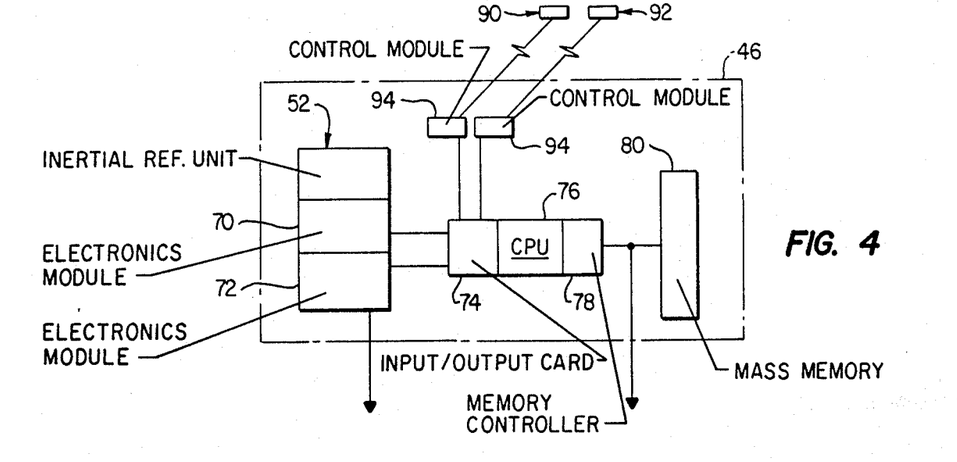
FIG. 4 is a schematic diagram of the major electrical components of the pipeline survey system of the present invention.

Referring now to FIG. 4, there is illustrated a schematic diagram of the major electronic components of the survey system of the present invention. In a preferred embodiment, the enclosure 46 is adapted to include space for the inertial reference unit 52 which basically comprises the three orthogonally arranged accelerometers and gyroscopes described in conjunction with the illustration of FIG. 3. The inertial reference unit 52 is operably associated with an electronics module 70 which includes operably connected counter timers, temperature sensors, power supply monitors, dither motor monitors, and analog to digital signal converters and associated memory units for correcting the signals delivered by the gyroscopes for temperature, dithering and coning induced errors in the gyroscope output signals. Corrected inertial data is input into a second microprocessor based electronics module 72 which performs actual inertial alignment and navigational computations. The electronics modules 70 and 72 are adapted to provide data to an input/output card 74 connected to a central processing unit 76 which is operably connected to a memory controller 78 and a mass memory 80.

Figure 5:
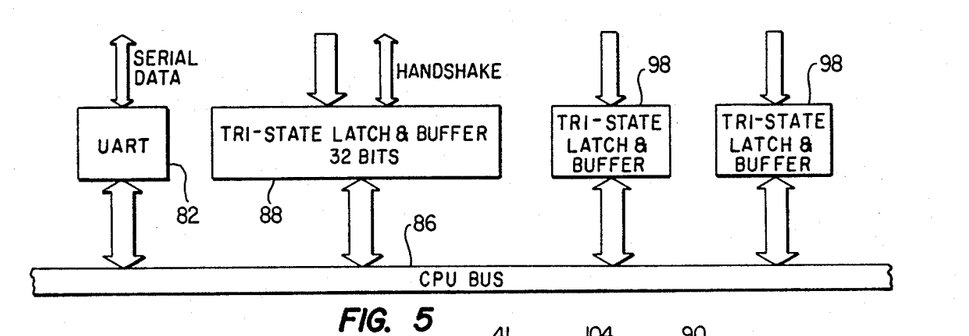
FIG. 5 is a schematic diagram of a portion of the data transmitting components of the system illustrated in FIG. 4.

FIG. 5 illustrates further details of the input/output card 74 which includes a UART module 82 operably connected to the module 72 and to a bus 86. The module 70 is operably connected to a tri-state latch and buffer 88, also connected to the bus 86.

FIG. 4 illustrates the provision of spaced apart position sensors 90 and 92 which are mounted on the pig 12 in one of several preferred ways and one of which will be described in further detail herein. The sensors 90 and 92 are of a type which will detect a magnetic anomaly in the pipeline such as provided by girth welds between pipeline sections. Each of the sensors 90 and 92 is operably associated with a module 94 which provides a signal output to the input/output card 74 through a tri-state latch and buffer 98, see FIG. 5, operably connected to the bus 86.

Figure 9:
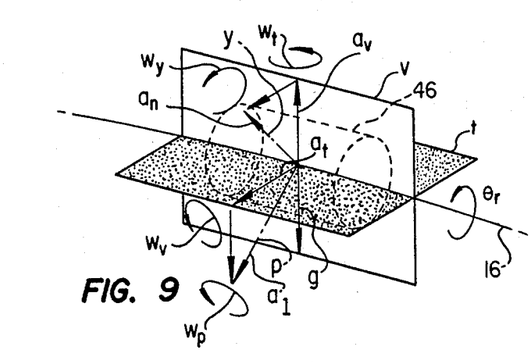
FIG. 9 is a diagram illustrating the parameters which are measured and calculated in determining the curvature of a pipeline.

Referring to FIG. 9, there is illustrated a diagram indicating the resolution of accelerations and angular velocities from those measured by the inertial reference unit 52 with respect to the local yaw and pitch axes y and p to values of accelerations in a tangential plane (t) and in a vertical plane (v) extending normal to the tangential plane and including the gravity vector g, both planes also having the axis 16 lying therein. The values of acceleration along the local yaw and pitch axes ($a_n$) and ($a_l$) are measured directly by the accelerometers of the inertial reference unit 52 and provided to the central processing unit 76. These local axes y and p rotate about the axis 16 through angle $\theta_r$, which angle corresponds to the roll position of the pig 12. The roll angle $\theta_r$ is sensed by the gyroscope 62. Moreover, the values of local angular velocity in the yaw direction about the axis y and the pitch direction about the axis p are measured by the inertial reference unit 52 and are indicated by the designations $w_y$ and $w_p$, respectively. The values of angular velocity in the tangential plane ($w_t$), and a vertical plane ($w_v$) normal to the tangential plane can be calculated. In like manner, the values of accelerations in the vertical plane and the tangential plane can be calculated and bear the designations $a_v$ and $a_t$, respectively, as indicated in FIG. 9.

Based on the equations of curvature indicated above, values of acceleration and angular velocity in the tangential plane and the vertical plane perpendicular to the tangential plane and including the axis 16 are computed by the central processing unit 76 from the following equations:

$$a_v = a_n \cos \theta_r - a_l \sin \theta_r$$

and curvature $k_v$ from equation (a) is thus $$k_v = \frac{a_n \cos \theta_r - a_l \sin \theta_r}{V^2}$$

Since:

$$a_t = a_n \sin \theta_r + a_l \cos \theta_r,$$

the value of curvature in the tangential or lateral plane is:

$$k_t = \frac{a_n \sin \theta_r + a_l \cos \theta_r}{V^2}$$

Confirmation or corroboration of the values of curvature in the vertical plane as well as the tangential plane may be obtained from the equations.

$$w_v = w_p \cos \theta_r + w_y \sin \theta_r \text{ and from equation (b):}$$

$$k_v = \frac{w_p \cos \theta_r - w_y \sin \theta_r}{V}$$

In like manner:

$$w_t = w_y \cos \theta_r - w_p \sin \theta_r$$

and thus curvature ($k_t$) in the tangential plane can be determined from equation (b)

$$k_t = \frac{w_y \cos \theta_r - w_p \sin \theta_r}{V}$$

The values of the accelerations and angular velocities used in deriving the equations of curvature are calculated by the central processing unit 76 and every ten values of angular velocities $w_t$ and $w_v$ as well as values of accelerations $a_v$ and $a_t$ are averaged and stored in the memory 80. The actual values of curvature based on these calculated and averaged values of angular velocity and acceleration may be computed at the end of a survey run using the values stored in the memory 80. This data may then be analyzed when the pig has traversed its survey run to determine curvature and course measurements. Calculating each value of angular velocity $w_v$ and $w_t$ based on measured values of angular velocity with respect to the pitch and yaw axes reduces errors in the resultant data as compared with a procedure wherein the measured values are averaged. This procedure is true for the values of accelerations $a_v$ and $a_t$ also. In general, the averaging process reduces signal errors, due to any motion of the pig laterally relative to the pipe, which could effect curvature measurements.

Figure 6:
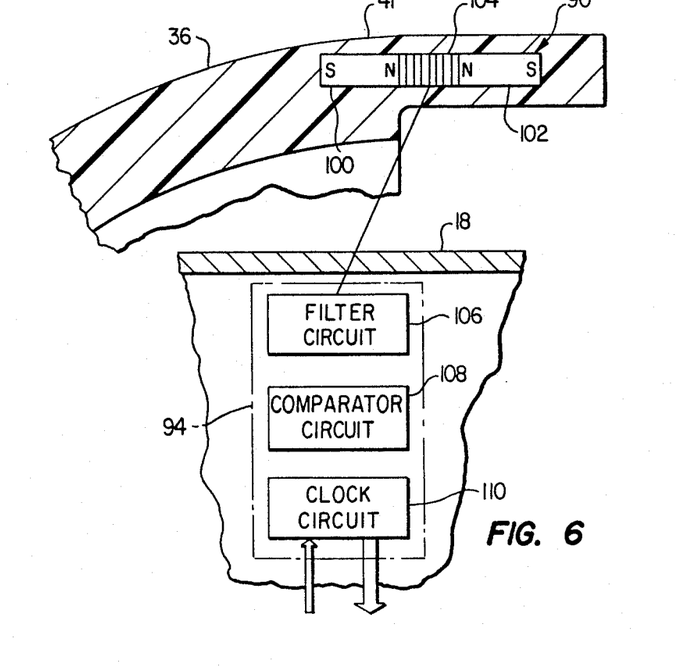
FIG. 6 is a schematic diagram illustrating one arrangement of a sensor for sensing a pipeline weld or other magnetic anomaly.
Figure 7:
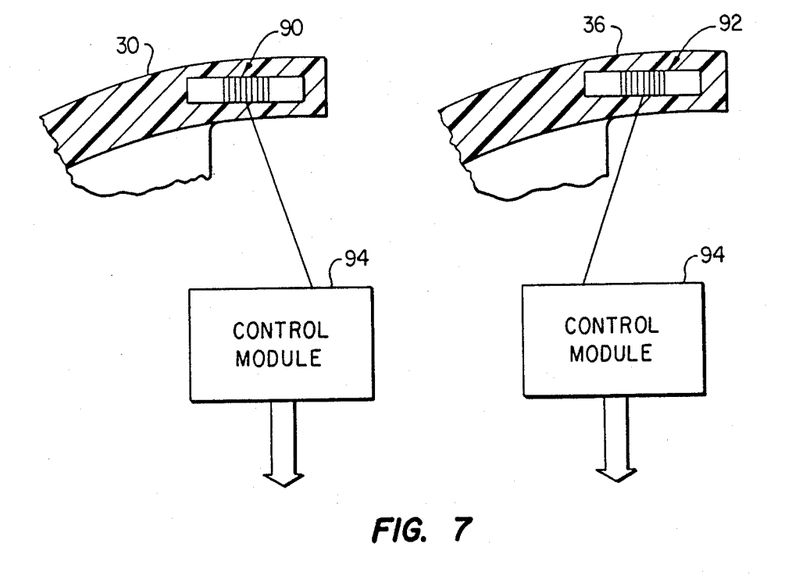
FIG. 7 is a schematic diagram of an arrangement of an alternate embodiment of a longitudinal velocity measuring arrangement employing two weld sensors and associated circuitry.

Referring now to FIGS. 6 and 7, examples of two arrangements of position sensors for use with the pig 12 are illustrated. By way of example in FIG. 6, sensor means adapted to register a magnetic anomaly such as caused by pipe girth weld comprises a sensor element 90 which may be embedded in one of the support members such as the support member 36 at its outer peripheral portion 41 so as to place the sensor in proximity to a girth weld or other element creating a magnetic anomaly. The sensor 90 is typically characterized by opposed permanent magnets 100 and 102 having a conductive wire coil 104 interposed therebetween. The change in the magnetic field generated by the magnets 100 and 102 when sensing a magnetic anomaly in the pipe produces an output signal to the control module 94 which includes a filter circuit 106 operably connected to a comparator circuit 108. When a signal of a magnitude above a predetermined threshold level is sensed by the comparator 108, a signal is output to a clock circuit 110 which in turn delivers a signal indicating the passing of a weld or other marker on a pipe section by the sensor 90.

FIG. 7 shows more detail of the arrangement of the two sensors 90 and 92 disposed in or mounted in proximity to the outer periphery of spaced apart support members 30 and 36. Each of the sensors 90 and 92 is connected to a circuit, including the components illustrated and described in conjunction with FIG. 6, so that output signals may be delivered to the central processing unit, when each of the sensors passes a signal generating marker such as a girth weld. In applications of the survey system of the present invention wherein the spacing of magnetic markers or girth welds is not known, the time delay between the generation of signals by each of the sensors 90 and 92 upon passing the same marker may be utilized to measure the velocity of the pig 12.

Figure 8:
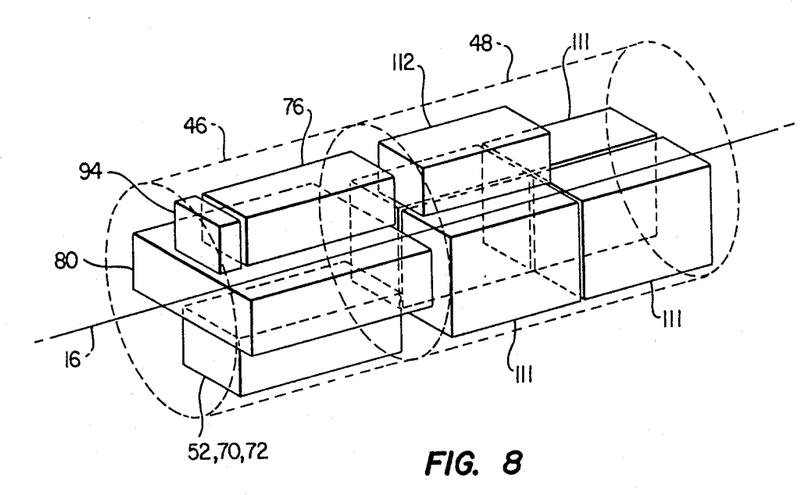
FIG. 8 is a somewhat schematic diagram illustrating another arrangement of the inertial reference unit mounted within the body of the apparatus illustrated in FIGS. 1 and 2 and including a schematic of the arrangement of further components used in the survey system.

Referring briefly to FIG. 8, an embodiment of the survey system, including the pig 12, is illustrated wherein an arrangement of components within the enclosures 46 and 48 is modified somewhat as compared with the arrangement illustrated in FIG. 3. In FIG. 8, the arrangement of components in the enclosure 46 includes the inertial reference unit 52 which is mounted spaced from the axis 16 but substantially parallel thereto as regards the arrangement of its accelerometers. Thanks to the provision of the electronic modules 70, 72 and the central processing unit 76, placement of the inertial reference unit spaced from the axis 16 may be compensated for so that corrected readings of data such as the pitch, roll and yaw attitude of the pig, together with output signals of acceleration and angular velocity may be provided by the accelerometers and gyroscopes and, of course, linear velocity of the pig through the pipeline being surveyed. The enclosure 46 also includes the mass memory 80, and the central processing unit 76, including the memory controller 78, and control circuitry 94, for the position sensors 90 and 92.

The enclosure 48 is adapted to receive batteries 111 comprising a source of power for driving the inertial reference unit 52 and the associated computing equipment and a voltage converter 112 mounted within the enclosure 48 for providing a suitable voltage signal to each of the respective components of the system. By way of example, the central processing unit 76 may comprise a CMOS micro PC - PC bus single board computer manufactured by Faraday Company of Sunnyvale, California. The mass memory 80 may comprise a solid state storage device having a battery backup system manufactured under the trademark "SCS BATRAM" by Santa Clara Systems, Inc., San Jose, Calif. The batteries 111 and the voltage converter 112 may also be of types which are commercially available. Although it is preferred to store all of the components illustrated in conjunction with FIG. 8 within a single body member such as the body 18 of the pig 12, for smaller diameter pipelines it may be necessary to construct the survey system in such a manner that the so-called pig is configured as an articulated member having end to end connected body members which are interconnected for movement relative to each other to facilitate conducting surveys through relatively sharp bends in smaller diameter pipelines.

The operation of the pipeline survey system of the present invention is believed to be apparent from the foregoing description of the system, including the pig 12. The pig 12 may be inserted into a pipeline to be surveyed at an appropriate pig launching fitting, not shown. At the time of launch, the inertial reference unit 52 may be programmed with altitude, latitude and longitude data, if known, so that a complete record of the section of pipe surveyed as to its location in space may be recorded. Once the pig 12 has been launched into the section of pipe, it is traversed over the length of pipe to be measured by propelling with a suitable fluid, such as crude oil. Particularly in oil or other liquid pipelines, the unwanted lateral excursion of the pig 12 is minimized by the damping effect of the fluid itself. As the pig 12 traverses the pipeline, if known magnetic anomaly markers are present, the position of the pig and its longitudinal velocity may be computed from measurements taken from the weld sensors 90 and/or 92. By taking acceleration and angular velocity readings from the accelerometers and the gyroscopes of the inertial reference unit 52 at rates of 1/50th of a second throughout the traverse of the pig 12 in the section of pipe to be measured, calculating the tangential and vertical accelerations and angular velocities, and averaging every ten computed values an average signal for tangential and vertical or accelerations and angular velocities are recorded every 1/5th of a second. If the normal natural frequency of the pig structure is, for example, 15 to 20 Hertz and the sampling rate is 50 Hertz, errors induced by vibration of the pig are minimized. Still further, the preferred location of the inertial reference unit 52 with respect to the center of gravity and the center of stiffness of the pig 12 also minimizes any unwanted excursion of the inertial reference unit away from the axis 16. At the end of a survey run, the data stored in the memory 80 may be retrieved and processed to calculate the curvature of the pipe surveyed and comparisons made between survey data taken by the survey system of the present invention with previous known surveys. Periodic surveys may be conducted with the system of the present invention and compared with previous surveys conducted by the same system.

Although a preferred embodiment of a pipeline survey system has been described herein, those skilled in the art will recognize that various substitutions and modifications may be made to the specific embodiments described without departing from the scope and spirit of the appended claims.

What is claimed is:

1. In a system for surveying a fluid transmission pipeline to detect changes in curvature of the course of said pipeline, a pipeline pig having a body and support means for supporting said body in said pipeline normally in a laterally fixed position with respect to the longitudinal central axis of said pipeline, said support means being adapted to provide for traversing said pig along said longitudinal axis, the improvement comprising:

an inertial reference unit mounted on said body and, including means for sensing accelerations normal to said longitudinal axis, means for sensing angular velocities normal to said longitudinal axis, means for generating signals related to said accelerations and said angular velocities, and means for recording further signals related to said signals generated by said acceleration sensing and angular velocity sensing means, said signal generating means and signal recording means being operable to generate and record signals at a rate which substantially exceeds the natural frequency of lateral vibration of said pig in said pipeline during traversal therethrough, whereby changes in curvature of said pipeline may be determined from signals recorded by said recording means while minimizing errors due to any lateral excursion of said pig in said pipeline.

2. The system set forth in claim 1 wherein:
said support means comprises at least one generally cylindrical resilient cup member for supporting said body in said pipeline and being contiguous with the inner wall surface of said pipeline.

3. The system set forth in claim 2 wherein:
said cup member includes a plurality of stiffening ribs extending radially from said axis whereby the stiffness of said cup member is such that its natural frequency of vibration is less than about one half the signal generating rate of said inertial reference unit.

4. The system set forth in claim 1 wherein:
the center of gravity of said pig is disposed substantially on said longitudinal axis during normal traversal of said pig through said pipeline free of lateral excursions with respect to said pipeline.

5. The system set forth in claim 4 wherein:
the center of stiffness of said pig is substantially coincident with said center of gravity.

6. The system set forth in claim 1 wherein:
the center of stiffness of said pig with respect to deflections laterally with respect to said longitudinal axis is located substantially along said longitudinal axis.

7. The system set forth in claim 1 wherein:
the center of gravity of said pig is disposed laterally spaced from said longitudinal axis a distance less than about 5% of the diameter of said pipe.

8. The system set forth in claim 1 wherein:
said inertial reference unit includes accelerometer means for sensing accelerations along said longitudinal axis and said signal generating means includes means for determining the velocity of said pig along said longitudinal axis from signals generated by said accelerometer means.

9. The system set forth in claim 1 including:
means on said pig for sensing magnetic anomalies along, said pipeline as said pig traverses said pipeline, nd means associated with said signal recording means for recording signals generated by said sensing means for determining at least one of the velocity of said pig during traversal of said pipeline and the position of said pig in said pipeline related to the measurement of signals generated by said accelerometer means and said angular velocity sensing means.

10. The system set forth in claim 1 including:
means for generating signals related to the angular velocity of said body about respective pitch and yaw axes normal to said longitudinal axis and for determining the roll angle of said body about said longitudinal axis relative to a reference point, means for computing a resultant angular velocrty in a tangential plane including said longitudinal axis and a plane normal to said tangential plane and .also including said longitudinal axis and the direction of gravitational force, and means for computing the velocity of said pig along said longitudinal axis.

11. The system set forth in claim 10 including:
means for averaging a selected number of values of resultant angular velocity to minimize errors resulting from any lateral excursions of said pig relative to said pipeline and means for transmitting an average value of angular velocity to said recording means.

12. The system set forth in claim 1 including:
means for generating signals related to the acceleration of said body about respective pitch and yaw axes normal to said longitudinal axis and for determining the roll angle of said body about said longitudinal axis relative to a reference point, means for computing a resultant acceleration in a tangential plane including said longitudinal axis and a plane normal to said tangential plane and also including said longitudinal axis and the direction of gravitational force, and means for computing the velocity of said pig along said longitudinal axis.

13. The system set forth in claim 12 including:
means for averaging a selected number of values of resultant acceleration to minimize errors resulting from any lateral excursions of said pig relative to said pipeline and means for transmitting an average value of acceleration to said recording means.

14. In a system for surveying a fluid transmission pipeline to detect changes in curvature of the course of said pipeline, a pipeline pig having a body and support means for supporting said body in said pipeline normally in a laterally fixed position with respect to the longitudinal central axis of said pipeline, said pig having a center of gravity disposed within about 5% of the diameter of said pipeline from said longitudinal axis during normal traversal of said pig through said pipeline free of lateral excursions with respect to said pipeline and a center of stiffness substantially coincident with said center of gravity, an inertial reference unit mounted on said body and including means for sensing accelerations normal to said longitudinal axis, means for sensing angular velocities normal to said longitudinal axis, means for determining the longitudinal velocity of said pig along said longitudinal axis and means for recording signals related to said acceleration signals, said angular velocity signals and said longitudinal velocity signals.

15. The system set forth in claim 14 including:
means for determining the roll angle of said body about said longitudinal axis, means for computing a resultant angular velocity in a tangential plane, including said longitudinal axis and in a plane normal to said tangential plane and including the direction of gravitational force, and means for averaging a selected number of values of said computed signals for transmission to said recording means.

16. The system set forth in claim 14 including:
means for determining the roll angle of said body about said longitudinal axis, means for computing a resultant acceleration in a tangential plane, including said longitudinal axis and in a plane normal to said tangential plane and including the direction of gravitational force, and means for averaging a selected number of values of said computed signals for transmission to said recording means.

17. In a system for surveying a fluid transmission pipeline to detect changes in curvature of the course of said pipeline, a pipeline pig having a body and support means for supporting said body in said pipeline normally in a laterally fixed position with respect to the longitudinal central axis of said pipeline, an inertial reference unit mounted on said body and including means for sensing accelerations normal to said longitudinal axis, means for sensing angular velocities normal to said longitudinal axis, means for determining the roll angle of said body about said longitudinal axis, means for computing resultant values of angular velocities and accelerations in a tangential plane including said longitudinal axis, and in a plane normal to said tangential plane, means for averaging a selected number of said resultant values to provide an average resultant value of angular velocity and acceleration, and means for recording said average values.

18. The system set forth in claim 17 wherein:
the center of gravity of said pig is disposed laterally spaced from said longitudinal axis a distance less than about 5% of the diameter of said pipeline.

19. The system set forth in claim 18 wherein:
the center of stiffness of said pig is substantially coincident with said center of gravity.

20. The system set forth in claim 17 wherein:
the center of stiffness of said pig with respect to deflections laterally with respect to said longitudinal axis is located substantially along said longitudinal axis.

21. The system set forth in claim 17 including:
means on said pig for sensing magnetic anomalies along said pipeline as said pig traverses said pipeline, and means associated with said recording means for recording signals generated by said sensing means for determining at least one of the velocity of said pig during traversals of said pipeline and the position of said pig in said pipeline related to said resultant values of angular velocity and acceleration.

22. In a system for surveying a fluid transmission pipeline to detect changes in curvature of the course of said pipeline, a pipeline pig having a body and support means for supporting said body in said pipeline normally in a laterally fixed position with respect to the longitudinal central axis of said pipeline, said support means being configured such that the center of stiffness of said pig is substantially coincident with its center of gravity, an inertial reference unit mounted on said body and including means for sensing at least one of accelerations normal to said longitudinal axis and angular velocities normal to said longitudinal axis, means for determining the roll angle of said body about said longitudinal axis, and means for recording at least one of values of angular velocities and accelerations in a tangential plane including said longitudinal axis, and in a plane normal to said tangential plane.

* * * * *